(No Model.)
D. R. CANNY.
WOOD RIM FOR WHEELS.
No. 561,157. Patented June 2, 1896.
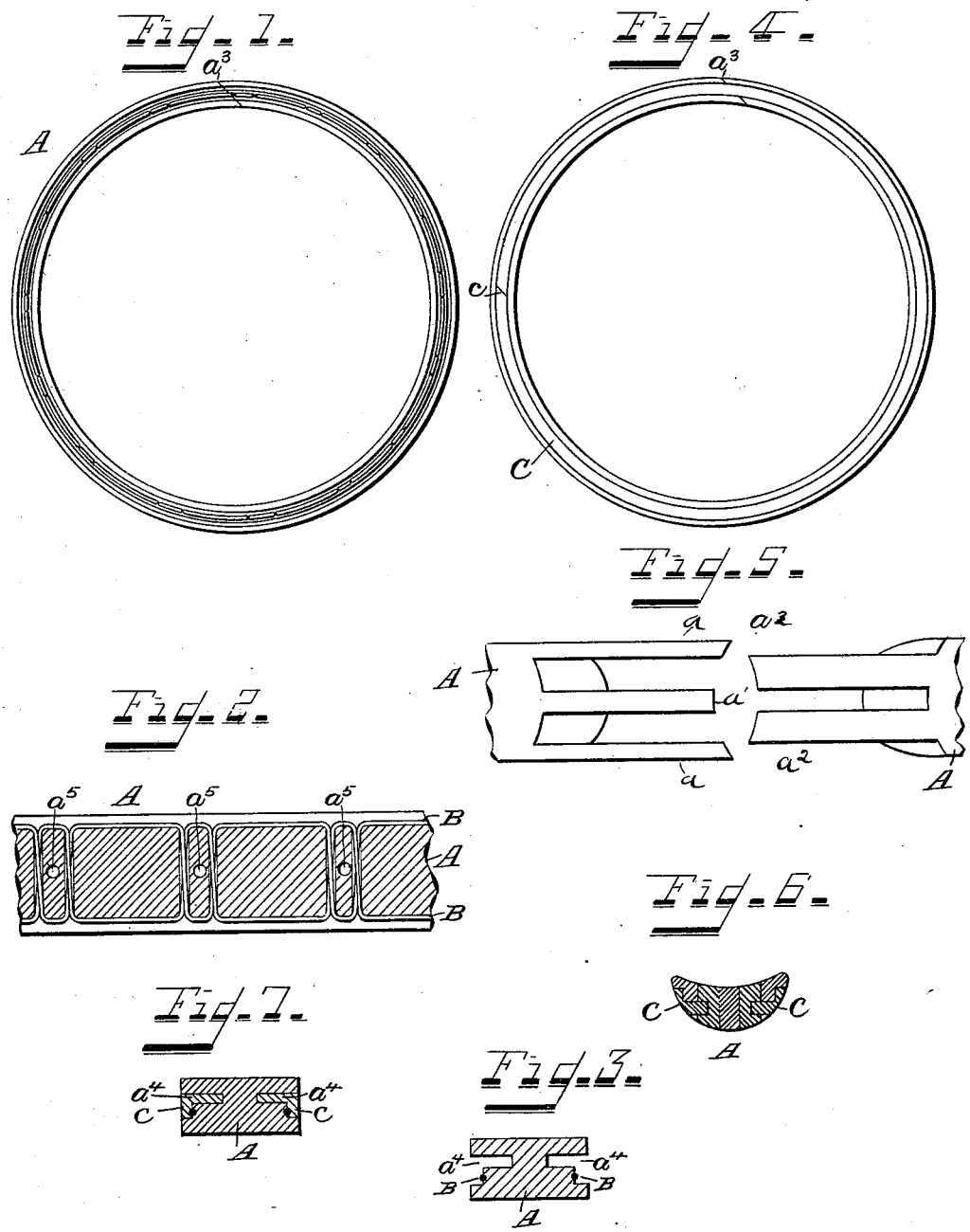
Witnesses.
Emma Lyford
Bertha Murray
Inventor.
David R. Canny
By Geo. J. Murray
Attorney.

UNITED STATES PATENT OFFICE.

DAVID R. CANNY, OF GREENFIELD, OHIO, ASSIGNOR TO JOHN M. WADDEL, OF SAME PLACE.

WOOD RIM FOR WHEELS.

SPECIFICATION forming part of Letters Patent No. 561,157, dated June 2, 1896.

Application filed November 29, 1895. Serial No. 570,392. (No model.)

*To all whom it may concern:*

Be it known that I, DAVID R. CANNY, a citizen of the United States, and a resident of Greenfield, in the county of Highland and State of Ohio, have invented certain new and useful Improvements in Wood Rims for Wheels, of which the following is a specification.

My invention relates to wooden rims for pneumatic wheel-tires. Its object is to provide a strong light rim and prevent the same from splitting. The rim being made of separate pieces of bent wood also strengthens the rim and gives the appearance of laminated wood.

In the drawings, Figure 1 is a side elevation of the main body of the rim after it is bent around, the ends secured together, the edges grooved, and the fastening-wires inserted. Fig. 2 is an enlarged sectional view through an arc of the rim, the line of the section being taken through the perforations through which the binding-wire is laced. Fig. 3 is a sectional view upon the same scale as Fig. 2, taken transversely through the body of the rim, Fig. 1. Fig. 4 is an edge elevation of the finished rim. Fig. 5 is a peripheral elevation of the meeting ends of the rim, showing the locking-joint which holds the meeting ends of the rim-body separated. Fig. 6 is a radial section through the lock-joint of the completed wheel. Fig. 7 is a view similar to Fig. 3, but with the side strips secured in place.

In constructing my improved rim a strip of wood A of the proper width, thickness, and length to form the main body of the rim is first cut out, having parallel sides and edges. The strip has its opposite ends formed with tenons $a$ $a'$ upon one end and tenons $a^2$ on the opposite end, the ends of all the tenons being beveled toward the inside of the rim and the ends of the rim from which the tenons project beveled in the opposite direction, so that when the joint is formed any pressure upon the outside of the rim is resisted by the inclined ends of the tenons and the walls of the rim against which they abut. After the rim is bent around and the joint $a^3$, Fig. 1, cemented together the piece A is put into a chuck, and the grooves $a^4$, as seen best is Fig. 3, formed around each edge. The offset at the inner edge of the rim is then transversely perforated upon opposite sides of the spoke-sockets $a^5$, and a fine steel wire B laced through these openings and drawn tightly all around the rim, and of course through the lock-joint, after which the strips C, which are formed to snugly fit the grooved recesses $a^4$ in the strip A, are cemented in place, as seen in Fig. 7. The joint $c$ of this strip, as seen in Fig. 1, is away from the joint $a^3$ in the body of the rim and is also beveled, forming a lap-joint, as seen in Fig. 4.

After the edge strips are secured in place the rim is placed in an inside chuck and shaped up on the inner side. After this is done it is put into an outside chuck and the rim grooved out on the periphery to receive and hold the pneumatic tire.

It is well known that in case of rough usage the wood tires are liable to split in a line with the spoke-sockets, and if cracked at all the crack is liable to extend and ruin the rim, while in my construction, even though the rim should crack, the wire strand being tightly laced would prevent the displacement of the parts and prevent the crack from extending across the transverse strands of the wire. The wire also passing through the joint assists in holding it securely, even should the cement become damp or weak.

I prefer to give the grooves the form shown at $a^4$, Fig. 3, and lace the wire band through the shoulder or counter sunk part of the groove, so that the tongue or tenon of the side strips C will enter the narrow deeper portions of the grooves $a^4$, thereby getting a better cementing-surface to hold the strip in place and also to prevent the slipping of the wire-lacing should any portion of it be broken by an unusual strain or twist upon the wheel-rim; but it would be an inferior modification of my invention to make a plain instead of a compound groove in the body of the rim, perforate the rim through the bottom of the groove, and lace the bands through such perforations.

What I claim as new, and desire to secure by Letters Patent, is—

1. In a wood rim for wheels the combination of the main body-strip grooved upon both edges and transversely perforated upon both sides of the spoke-sockets, the strand laced through said perforations, and the strips closing the grooves in the main body-piece, substantially as shown and described.

2. The hereinbefore-described wood rim for wheels, having its main body perforated upon both sides of the spoke-sockets and interlaced with strands of wire, said strands passing around the spoke-sockets for the purpose of preventing the spokes from splitting the rim.

3. The combination of the main body-strip having its edges grooved, alternating tenons at its opposite ends forming an interlocking joint and transversely perforated upon opposite sides of its spoke-sockets, the wire laced through perforations around the spoke-sockets and through the interlocking-joint tenons, and the side strips closing the groove in the main body-strip, and having their joints out of line with the joint in said body-strip, substantially as shown and described.

4. The combination of the main body-strip having its edges grooved, alternating tenons at opposite ends forming an interlocking joint, the ends of all the tenons being beveled toward the inside of the rim and the ends of the rim from which the tenons project beveled in the opposite direction, and the side strips closing the groove in the main body-strip and having their joints out of line with the joint in said body-strip, substantially as shown and described.

DAVID R. CANNY.

Witnesses:
  AMY ROBINSON,
  LEW. P. WADDEL.